United States Patent
Fly

(10) Patent No.: US 12,250,622 B2
(45) Date of Patent: Mar. 11, 2025

(54) AUTOMATED DISCOVERY SCHEDULES FOR TELECOMMUNICATION SERVICE NETWORKS

(71) Applicant: T-MOBILE INNOVATIONS LLC, Overland Park, KS (US)

(72) Inventor: Marcus David Fly, Prosper, TX (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 388 days.

(21) Appl. No.: 17/750,644

(22) Filed: May 23, 2022

(65) Prior Publication Data
US 2023/0379804 A1    Nov. 23, 2023

(51) Int. Cl.
*H04W 48/16* (2009.01)
*H04W 64/00* (2009.01)

(52) U.S. Cl.
CPC ......... *H04W 48/16* (2013.01); *H04W 64/003* (2013.01); *H04W 64/006* (2013.01)

(58) Field of Classification Search
CPC .. H04W 48/16; H04W 64/003; H04W 64/006
See application file for complete search history.

(56) References Cited

U.S. PATENT DOCUMENTS

| | | | |
|---|---|---|---|
| 2020/0220942 A1* | 7/2020 | Paranjpe | H04L 67/568 |
| 2021/0004441 A1* | 1/2021 | Sapugay | G06N 5/01 |
| 2021/0004537 A1* | 1/2021 | Sapugay | G06F 16/686 |
| 2022/0284045 A1* | 9/2022 | Saha | G06F 16/35 |

* cited by examiner

*Primary Examiner* — Mazda Sabouri
(74) *Attorney, Agent, or Firm* — SHOOK, HARDY & BACON L.L.P.

(57) ABSTRACT

Methods, media, and systems are provided for automated discovery schedules for telecommunication networks associated with a particular provider. The methods, media, and systems identify telecommunication networks corresponding to the provider. Additionally, location data for each of the telecommunication networks is received. The location data may be associated with one or more IP addresses for each telecommunication network. Servers or server clusters are identified along with associated location data for the servers or server clusters. The servers or server clusters are also associated with the provider. The location data for each of the telecommunication networks and the location data for each of the servers or server clusters are mapped. A distance between at least one of the telecommunication networks and at least one of the servers or server clusters is determined. Based on the distance determined, a telecommunication network is assigned a discovery schedule.

12 Claims, 8 Drawing Sheets

300

| | | | |
|---|---|---|---|
| NAME | 10.158.14.0/24 | SIZE | DC:WA WENATCHEE(PO... |
| VIEW | EIT_VRF | SITE ID | EWNCWADT! |
| NETWORK IP | 10.158.14.0 | LOCATION | EWNCWADT-4400 MAIN |
| NETMASK | 24 | LOCATION OVERIDE | |
| STATUS | IN USE/DEPLOYED | COMPANY | COMPANY 1 |
| NETWORK TYPE | NETWORK 1 PRIVATE | VLAN | 4 |
| DISCOVERY SCHEDULE | 10.158.14.0/24 | SERVICE | |
| EXCLUDE FROM DISCOVERY | | SERVICE BLOCKER | NPE. VRF - TEST |
| DESCRIPTION | DEDICATED FOR OPERATING SYSTEM VM – 2 CLUSTERS RO | | |
| COMMENTS | COMMENTS | | |

[POST]

| AUTOMATED DISCOVERY PROPERTIES |
|---|
| AUTOMATED DISCOVERY PROPERTIES |
| NUMBER OF MINUTES USED AS AN INTERVAL BETWEEN DISCOVERY SCHEDULE TIMES (?) |
| 15 |
| MAXIMUM SHAZZAM BATCH SIZE. DEFAULT: 1000 (?) |
| 1000 |
| MAXIMUM NETWORK BLOCK SIZE FOR SHAZZAM CLUSTER SUPPORT. DEFAULT: 19 (?) |
| 19 |
| TELLS AUTOMATED DISCOVERY SCHEDULES TO USE A TIME ZONE MAPPING TABLE TO MATCH DISPARATE TIME ZONE (?) LISTED IN CMN_LOCATION TO AN OOB TIME ONE VALUE |
| ☑ YES \| NO |
| SAVE |

| MID Server Cluster | Network Viewer | Default | Service Block Inclusion | Service Block Exclusion |
|---|---|---|---|---|
| LS-PRD-DISCOVERY | LS PLACEHOLDER | TRUE | | |
| NOB-OSS-PRD-DISCOVERY | SPRINT OSS ACCESS | TRUE | | |
| PX_PRD_CDE_DISCOVERY | EIT VRF | TRUE | L3 DMZ CDE-INT L3 EXTERNAL... | |
| NOB-OSS-PRD DISCOV... | LS PLACEHOLDER OSS | FALSE | | |
| TT-PRD-DISCOVERY | L3TV | FALSE | | |
| PX-PRD DISCOVERY | L3TV | TRUE | | |
| RT-PRD-DISCOVERY | LS PLACEHOLDER | FALSE | | |
| RT-OSS-PRD-DISCOVERY | SPRINT OSS ACCESS | FALSE | | |
| TT-PRD-DISCOVERY | EIT VRF | FALSE | | POOL - OMW |
| BLV-LAB-DISCOVERY | LAB - BELLEVUE | TRUE | | |
| PX-PRD-DISCOVERY | EIT VRF | TRUE | | POOL - OMW |
| RT-OSS-PRD-DISCOVERY | LS PLACEHOLDER OSS | TRUE | | |
| TT-PRD-DISCOVERY | GLOBAL | FALSE | | POOL - OMW |
| PX-PRD-DISCOVERY | GLOBAL | TRUE | | POOL - OMW |
| TT-PRD-DISCOVERY | NMNET | FALSE | | |
| PX-PRD-DISCOVERY | NMNET | TRUE | | |

*FIG. 5.*

AUTOMATED DISCOVERY SCHEDULES FOR TELECOMMUNICATION SERVICE NETWORKS

SUMMARY

A high-level overview of various aspects of the invention are provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter. The present disclosure is directed, in part, to systems and methods for automated discovery schedules for telecommunication service networks, substantially as shown in and/or described in connection with at least one of the figures, and as set forth more completely in the claims.

In aspects set forth herein, and at a high level, the systems and methods identify telecommunication network properties for telecommunication networks corresponding to a telecommunication network provider. The telecommunication network properties comprise at least location data associated with a telecommunication network. In aspects, the location data comprises a latitude and a longitude. Additionally, one or more management instrumentation and discovery (MID) servers or MID server clusters and associated location data associated are identified. The one or more MID servers or MID server clusters each correspond to the telecommunication network provider.

The location data associated with the telecommunication networks and the location data associated with the MID servers or MID server clusters are mapped for identifying distances between the locations of the telecommunication networks and the locations of the MID servers or MID server clusters. Based on the mapping, a first MID server is determined to have a shortest distance to a first telecommunication network of the telecommunication networks. In some aspects, the distance between a subset of telecommunication networks and a MID server cluster is determined to be below a threshold. Based on the distance determined between the locations of the telecommunication networks and the locations of the MID servers or MID server clusters, a discovery schedule is automatically assigned from a MID server to an endpoint of a telecommunication network.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein:

FIG. 3 depicts an example interface comprising telecommunication network properties, in accordance with aspects herein;

FIG. 4 illustrates an example interface comprising automated discovery properties for a discovery schedule, in accordance with aspects herein;

FIG. 5 illustrates an example interface comprising server cluster identifiers and network identifiers, in accordance with aspects herein;

DETAILED DESCRIPTION

Figure 1:
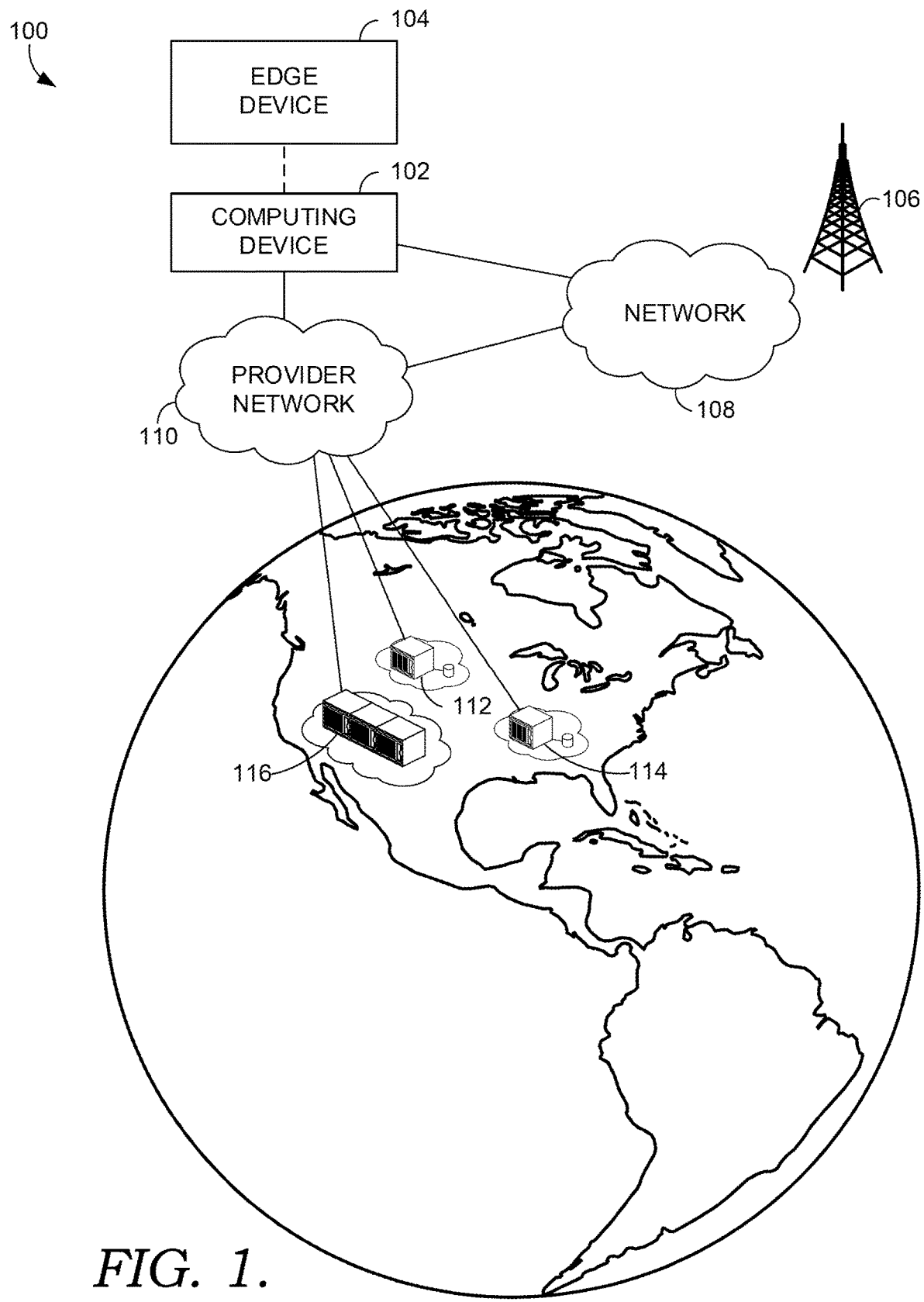
FIG. 1 depicts an example environment comprising networks and servers for automated discovery schedules, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CA Carrier Aggregation
CD-ROM Compact Disk Read Only Memory
CDMA Code Division Multiple Access
CLLI Common Language Location Identifier
CSI Channel State Information
eNB Evolved Node B
FDD Frequency Division Duplex
gNB Next Generation Node B
GPRS General Packet Radio Service
GSM Global System for Mobile communications
DVD Digital Versatile Discs
EEPROM Electrically Erasable Programmable Read Only Memory
FD-MIMO Full-Dimension Multiple-Input Multiple-Output
IoT Internet of Things
LTE Long Term Evolution
MAC Media Access Control
MID Management Instrumentation and Discovery
MIN/10 Multiple-Input Multiple-Output
MU-MIMO Multi-User Multiple-Input Multiple-Output NR New Radio
OFDM Orthogonal Frequency-Division Multiplexing
OTDOA Observed Time Difference of Arrival
PC Personal Computer
PDA Personal Digital Assistant
PLMN Public Land Mobile Network
QoS Quality of Service
RAM Random Access Memory
RF Radio-Frequency
ROM Read Only Memory
RSRP Reference Transmission Receive Power
RSRQ Reference Transmission Receive Quality
RSSI Received Signal Strength Indicator
SIM Subscriber Identity Module
SINR Signal-to-Interference and Noise Ratio
TDD Time Division Duplex
TDMA Time Division Multiple Access
UICC Universal Integrated Circuit Card
VLAN Virtual Local-Area-Network
VoNR Voice over NR
VoLTE Voice over LTE In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Further, the term "some" may refer to "one or more." Additionally, an element in the singular may refer to "one or more." The term "combination" (e.g., a combination thereof, combinations thereof) may refer to, for example, "at least one of A, B, or C"; "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.). Other combinations may include more or less than three options associated with the A, B, and C examples.

Additionally, a "user device," as used herein, is a device that has the capability of using a wireless communications network, and may also be referred to as a "computing device," "mobile device," "user equipment," "wireless communication device," or "UE." A user device, in some aspects, may take on a variety of forms, such as a PC, a laptop computer, a tablet, a mobile phone, a PDA, a server, or any other device that is capable of communicating with other devices (e.g., by transmitting or receiving a signal) using a wireless communication. A user device may be, in an embodiment, similar to user device 102 described herein with respect to FIG. 1. A user device may also be, in another embodiment, similar to user device 800, described herein with respect to FIG. 8.

A user device may additionally include internet-of-things devices, such as one or more of the following: a sensor, controller (e.g., a lighting controller, a thermostat), appliances (e.g., a smart refrigerator, a smart air conditioner, a smart alarm system), other internet-of-things devices, or combinations thereof. Internet-of-things devices may be stationary, mobile, or both. In some aspects, the user device is associated with a vehicle (e.g., a video system in a car capable of receiving media content stored by a media device in a house when coupled to the media device via a local area network. In some aspects, the user device comprises a medical device, a location monitor, a clock, other wireless communication devices, or a combination thereof.

In aspects, a user device discussed herein may be configured to communicate using one or more of 4G (e.g., LTE), 5G, 6G, another generation communication system, or a combination thereof. In some aspects, the user device has a radio that connects with a 4G cell site but is not capable of connecting with a higher generation communication system. In some aspects, the user device has components to establish a 5G connection with a 5G gNB, and to be served according to 5G over that connection. In some aspects, the user device may be an E-UTRAN New Radio-Dual Connectivity (ENDC) device. ENDC allows a user device to connect to an LTE eNB that acts as a master node and a 5G gNodeB that acts as a secondary node. As such, in these aspects, the ENDC device may access both LTE and 5G simultaneously, and in some cases, on the same spectrum band.

Wireless telecommunication services (e.g., the transfer of information without the use of an electrical conductor as the transferring medium) may be provided by one or more telecommunication network providers. Wireless telecommunication services may include, but are not limited to, the transfer of information via radio waves (e.g., Bluetooth®), satellite communication, infrared communication, microwave communication, Wi-Fi, millimeter wave communication, and mobile communication. Embodiments of the present technology may be used with different wireless telecommunication technologies or standards, including, but not limited to, CDMA 1x Advanced, GPRS, Ev-DO, TDMA, GSM, WiMax technology, LTE, LTE Advanced, other technologies and standards, or a combination thereof.

A network providing the wireless telecommunication services may be a telecommunication network(s), or a portion thereof. A telecommunication network might include an array of devices or components (e.g., one or more cell sites). The network can include multiple networks, and the network can be a network of networks. In embodiments, the network is a core network, such as an evolved packet core, which may include at least one mobility management entity, at least one serving gateway, and at least one Packet Data Network gateway. The mobility management entity may manage non-access stratum (e.g., control plane) functions such as mobility, authentication, and bearer management for other devices associated with the evolved packet core.

In some aspects, a network can connect one or more user devices to a corresponding immediate service provider for services such as 5G and LTE, for example. In aspects, the network provides wireless telecommunication services comprising one or more of a voice service, a message service (e.g., SMS messages, MMS messages, instant messaging messages, an EMS service messages), a data service, other types of wireless telecommunication services, or a combination thereof, to user devices or corresponding users that are registered or subscribed to a telecommunication service provider to utilize the one or more services. The network can comprise any communication network providing voice, message, or data service(s), such as, for example, a 1×circuit voice, a 3G network (e.g., CDMA, CDMA2000, WCDMA, GSM, UMTS), a 4G network (WiMAX, LTE, HSDPA), a 5G network, a 6G network, another generation network, or a combination thereof.

Components of the network, such as terminals, links, and nodes (as well as other components), can provide connectivity in various implementations. For example, components of the network may include core network nodes, relay devices, integrated access and backhaul nodes, macro eNBs, small cell eNBs, gNBs, relay cell sites, other network components, or a combination thereof. The network may interface with one or more cell sites through one or more wired or wireless backhauls. As such, the one or more cell sites may communicate to devices via the network or directly. Furthermore, user devices can utilize the network to communicate with other devices (e.g., a user device(s), a server(s), etc.) through the one or more cell sites.

As used herein, the term "cell site" (used for providing UEs with access to the telecommunication services) generally refers to one or more cellular base stations, nodes, RRUs control components, and the like (configured to provide a wireless interface between a wired network and a wirelessly connected user device). A cell site may comprise one or more nodes (e.g., eNB, gNB, and the like) that are configured to communicate with user devices. In some aspects, the cell site may include one or more band pass filters, radios, antenna arrays, power amplifiers, transmitters/receivers, digital signal processors, control electronics, GPS equipment, and the like. An eNB or gNB corresponding to the cell site may comprise one or more of a macro base station, a small cell or femtocell base station, a relay base station, a combination thereof, and so forth. In aspects, the cell site may be configured as FD-MIMO, massive MIMO, MU-MIMO, cooperative MIMO, 3G, 4G, 5G, another generation communication system, or a combination thereof. In addition, the cell site may operate in an extremely high frequency region of the spectrum (e.g., from 30 GHz to 300 GHz), also known as the millimeter band.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, prior methods and systems failed to provide automated discovery schedules due to blindly scanning networks, which result in the failure to identify and locate all relevant networks for the automated discovery schedules. The prior methods and systems also fail to inspect or identify particular features in the relevant networks that are identified, and fail to maintain the relevant networks upon identification. These deficiencies of the prior methods and systems result in the failures of scheduling discovery schedules to the networks that are not identified or located and failures of scheduling appropriate discovery schedules. Rather, the discovery schedules that these prior methods and systems do provide do not account for the features of the network that were not inspected. Additionally, the discovery schedules that these prior methods and systems do provide do not account for updates or changes to the relevant network. Additionally, these discovery schedules of the prior methods and systems do not provide or indicate bit information associated with IP addresses, due to the failure to inspect or identify the particular features in the relevant networks. Accordingly, the prior methods and systems ultimately fail to provide appropriate discovery schedules and fail to provide automated discovery schedules.

The systems and methods provided herein can alleviate the problems discussed above. For instance, in aspects, embodiments disclosed herein provide for automated discovery schedules by identifying and locating all relevant networks for automated discovery schedules. The technology disclosed herein also inspects or identifies particular features in the relevant networks that the prior methods and systems failed to identify and inspect. Further, the technology disclosed herein accounts for updates or changes to the relevant network for proper identification of the relevant networks and for assigning the discovery schedules. In some aspects, the automated discovery schedules disclosed herein provide or indicate bit information associated with IP addresses, unlike the prior methods and systems. As such, the technology disclosed herein improves upon the prior methods and systems in various ways.

Accordingly, in one aspect, a system is provided for automated discovery schedules for telecommunication networks. The system comprises one or more processors and computer memory storing computer-usable instructions that, when executed by the one or more processors, perform operations. The operations comprise identifying a plurality of telecommunication networks corresponding to a telecommunication network provider. In addition, location data for each of the plurality of telecommunication networks is received. One or more server clusters and location data associated with each of the one or more server clusters are identified. The one or more server clusters correspond to the telecommunication network provider. The location data for each of the plurality of telecommunication networks and the location data for each of the one or more server clusters are mapped. Based on the mapping, a first server cluster of the one or more server clusters is determined to have a shortest distance to a first telecommunication network of the plurality of telecommunication networks. A discovery schedule is assigned from the first server cluster to an endpoint of the first telecommunication network.

In another aspect, a method is provided for assigning automated discovery schedules for telecommunication networks. The method comprises identifying a telecommunication network corresponding to a telecommunication network provider. The method also comprises receiving location data for the telecommunication network. Additionally, a MID server and location data associated with the MID server are identified. The MID server corresponds to the telecommunication network provider. The location data for the telecommunication network and the location data for the MID server are mapped. Based on the mapping, it is determined that the MID server has a distance to the telecommunication network that is below a first threshold. A discovery schedule is assigned from the MID server to an endpoint of the telecommunication network.

Another aspect provides for non-transitory computer-readable media having computer-usable instructions embodied thereon that, when executed by a processor, perform operations for assigning automated discovery schedules for telecommunication networks. The operations comprise identifying telecommunication network properties for each of a plurality of telecommunication networks corresponding to a telecommunication network provider. The telecommunication network properties for each of the plurality of telecommunication networks include at least a location identifier. The operations further comprise identifying a plurality of MID servers and location data associated with each of the plurality of MID servers. The plurality of MID servers correspond to the telecommunication network provider. Data from the location identifier for each of the plurality of telecommunication networks and the location data associated with each of the plurality of MID servers are mapped. Based on the mapping, a first MID server of the plurality of MID servers is determined to have a distance to a first telecommunication network of the plurality of telecommunication networks that is below a first threshold. The operations further comprise causing an assignment of a discovery schedule from the first MID server to an endpoint of the first telecommunication network.

Turning now to FIG. 1, example environment 100 comprises computing device 102, edge device 104, cell site 106, network 108, provider network 110, server 112, server 114, and server cluster 116. Example environment 100 is but one example of a suitable environment for determining a priority-based pairing threshold for codebook beamforming, and is not intended to suggest any limitation as to the scope of use or functionality of the invention. Neither should the environment 100 be interpreted as having any dependency or requirement relating to any one or combination of components illustrated.

Beginning with computing device 102, the computing device may take on a variety of forms including: a PC, a user device, a smart phone, a smart watch, a laptop computer, a desktop computer, a mobile phone, a mobile device, a tablet computer, a wearable computer, a PDA, a server, a CD player, an MP3 player, a GPS device, a video player, a handheld communications device, a workstation, a router, a hotspot, and any combination of these delineated devices, or any other device (such as the computing device 800 in FIG. 8) that communicates via wireless communications to interact with a public or private network.

The computing device 102 is configured to communication by way of one or more transmissions with cell site 106 using 3G, 4G, 5G, another generation, or a combination thereof. The computing device 102 may communicate with other computing devices and with the provider network 110 using the network 108 (such as the Internet, for example). Additionally, the edge device 104 is configured to send and receive data (e.g., configuration information) over the provider network 110 via the network 108. For example, the edge device 104 may also access a cloud computing service and interact with a web browser application associated with the provider network 110. The edge device 104 may also implement peer-to-peer communications. The edge device 104 may be configured to communicate with other devices, perform data collection, and perform machine learning. In aspects, the edge device 104 is on the edge of a large distributed network of data-connected devices.

In some embodiments, the edge device 104 is an internet-of-things device. Edge device 104 may include a recording device (e.g., one or more digital cameras, one or more video cameras, one or more audio recorders, or a combination thereof), a city management device (e.g., one or more parking sensors, one or more traffic sensors, one or more water quality devices, or a combination thereof), a vehicle (e.g., a car, a truck, an airplane, a boat, a jet ski), a body sensor (e.g., one or more vital sign sensors, one or more pedometers), an environmental sensor (e.g., one or more weather sensors, one or more pollution sensors, one or more air quality sensors), a wearable computing device (e.g., a smart watch, glasses, or clothes), personal computing devices, a home device (e.g., one or more appliances, one or more thermostats, one or more light systems, one or more security systems), an advertising device (e.g., one or more billboards, one or more information kiosks), and so forth.

As shown in FIG. 1, computing device 102 and edge device 104 may wirelessly communicate with cell site 106 using one or more of FD-MIMO, massive MIMO, MU-MIMO, cooperative MIMO, 3G, 4G, 5G, another generation communication system, 802.11, or millimeter waves. Additionally, other wireless communication protocols may be utilized in conjunction with aspects described herein. In some aspects, an eNB or gNB corresponding to cell site 106 may comprise a macro base station, a small cell or femto base station, a relay, and so forth. As discussed herein, cell site 106 is deployed in a network to control and facilitate, via one or more antenna arrays, the broadcast, transmission, synchronization, and receipt of one or more wireless signals in order to communicate with, verify, authenticate, and provide wireless communications service coverage to one or more computing devices or other types of devices that request to join or are connected to the network.

The network 108 may include one or more telecommunication networks (or a portion of a network or a network of networks), such as local area networks, wide area networks, the Internet, other remote networks, or a combination thereof to transfer data between the computing device 102 or the edge device 104 and the provider network 110. The network 108 may comprise one or more wired or wireless programmable devices, such as cellular networks (e.g., a Global System for Mobile communications), IEEE 802.11 networks, other suitable radio-based networks, or a combination thereof. The network 108 may also include one or more network devices, such as servers, routers, network switches, other network hardware devices configured to transport data over the network 108, or a combination thereof.

Provider network 110 may comprise a cloud service that includes one or more computing devices in one or more geographic locations connected via one or more networks. For example, the provider network 110 may include one or more servers or computers acting as servers in datacenters at one or more geographic locations where the servers communicate using network or Internet connections. A communication channel between the provider network 110 and the one or more servers or computers acting as servers in datacenters (e.g., the servers 112-116) or a communication channel between the provider network 110 and the computing device 102 (or the edge device 104) may include any suitable communication mechanism for electronic communication. The communication channel may incorporate one or more of local area networks, wide area networks, virtual private networks, cellular networks (e.g., long-term evolution networks), wireless fidelity Wi-Fi networks, Bluetooth, Near Field Communication, other network types for transferring data, or a combination thereof.

For example, the communication channel may include an Internet connection when the computing device 102 is not on a local network common with the provider network 110. Additionally or alternatively, the communication channel may include network connection sections when the computing device 102 and the provider network 110 are on different networks. The provider network 110 may also include a dedicated network device (e.g., gateway or router) or a combination of network devices (not shown) that implement a particular firewall or intrusion protection system. Although only a single computing device 102 is shown connected to the provider network 110, the provider network 110 may connect to multiple computing devices (e.g., tens, hundreds, or thousands of computing devices).

Through the provider network 110, the computing device 102 may connect to various devices with various functionality, such as gateways, routers, load balancers, databases, application servers running application programs on one or more nodes, or other devices that may be accessed via the provider network 110. For example, the computing device 102 may connect to an application server or one or more databases via the provider network 110. The application server may include any computing device or system, such as a desktop computer, laptop computer, server computer, or any other computing device capable of providing functionality from an application program to the computing device 102. The application server may include one or more application nodes running application programs whose functionality is provided to the computing device 102 via the provider network 110. The application nodes may be implemented using processing threads, virtual machine instantiations, or other computing features of the application server. Moreover, the application nodes may store, evaluate, or retrieve data from the databases or a database server.

In aspects, the provider network 110 connects with one or more datacenters comprising one or more servers. In some embodiments, each datacenter corresponds to a different geographic location. Within a particular datacenter, a cloud service of the provider network 110 may include a plurality of servers (e.g., server 112, server 114, or server cluster 116). Although the server 112, the server 114, and the server cluster 116 are illustrated as being located within different states in example environment 100; in some embodiments, two or more datacenters (or other server centers) comprising one or more servers may be located within the same state, within the same city, within the same county, within the same region, within the same town, on the same street, within the same building, or within another geographical area.

A server may include an access point, a router, another device configured to provide for local computational resources or facilitate communication between or among networks and devices, or a combination thereof. Each server, in some aspects, may be implemented on a physical computing system, such as a single electronic computing device (e.g., a single physical hardware server). In some aspects, one or more servers of a datacenter is a multi-computing device (e.g., multiple physical hardware servers). Examples of a server may include, but are not limited to, a web server (e.g., a unitary Apache installation), an application server (e.g., unitary Java® Virtual Machine), a database server (e.g., a unitary MySQL® catalog), or a combination thereof.

In some embodiments, one or more servers (e.g., server 112, server 114, or server cluster 116) of the one or more datacenters is a MID server. In aspects, the MID server is configured to communicate via an External Communications Channel. A MID server may include an application program (e.g., a Java® application) that runs as a service (e.g., Windows service or UNIX daemon) for facilitating communication and data movement between a local network (a network local to the MID server) and one or more external applications, one or more databases, or one or more services. The MID server may be executed using a computing device (e.g., server or computer) on a network (e.g., a local network) that communicates with the provider network 110.

A MID server may periodically or intermittently use discovery probes to determine information on devices connected to the local network and return the probe results back to the provider network 110. In aspects, the MID server is located inside the local network, thereby alleviating the use of a firewall in communication between other nearby devices and the MID server. In some embodiments, a secure tunnel may be generated between a MID server running in a cloud service of the local network in which the MID server is not located in, such that the cloud service communicates with a border gateway device of the local network.

As shown in example environment 100, the provider network 110 includes server 112, server 114, and server cluster 116. In some embodiments, other environments may include a plurality of server clusters located within one or more datacenters. Servers 112-116 facilitate data communications between provider network 110 and other networks. Servers 112-116 may also facilitate communication between other external applications, databases, or services, and provider network 110. In example environment 100, one or more of servers 112-116 have singular access to one or more databases storing private data. Accordingly, to access the one or more databases, operations are executed by the corresponding server 112-116. In embodiments, the MID server cluster 116 comprises three nodes. In some embodiments, the MID server cluster 116 comprises two or more nodes. In some embodiments, a MID server cluster comprises a number of nodes greater than three. In some aspects, each node of a MID server cluster may be considered equivalent to each other (e.g., equivalent capabilities to perform operations designated for that particular MID server cluster). In some aspects, internal load balancing mechanisms (e.g., cluster load balancing) may assist overall operation assigning techniques associated with task flow execution.

Location data associated with one or more servers (e.g., a MID server or a MID server cluster) may be stored for retrieval by the server, one or more other servers, a computing device, an edge device, another device, or a combination thereof, at one or more databases. For example, the one or more database may be located in a cloud service of the provider network 110. In aspects, the one or more databases are located within a network local to the one or more servers. In some aspects, the location data corresponding to the server (e.g., a MID server or a MID server cluster) may be associated with one or more gateways, one or more routers, one or more load balancers, one or more databases, one or more nodes of one or more application servers running application programs on the one or more nodes, one or more other devices that may be accessed via the provider network 110, or a combination thereof. In some aspects, the location data comprises one or more of a latitude, a longitude, or an altitude.

Location identifiers corresponding to telecommunication networks provided by the provider network 110 are also stored at one or more databases for retrieval by the server, one or more other servers, a computing device, an edge device, another device, or a combination thereof. Each of the telecommunication networks may comprise a plurality of subnetworks. Location identifiers may be stored and continuously updated for each network of each subnetwork. Other network identifiers may also be stored and updated for each network of each subnetwork (e.g., a name identifier and other identifiers, as discussed in FIG. 3). The network identifiers may be used for identifying each network. In some aspects, the location identifier includes location data usable for identifying each network and a location of each network.

In some aspects, the location data may be associated with a cloud service of the provider network 110. For example, the location data may be associated with one or more computing devices or other devices in one or more geographic locations connected with the cloud service of the provider network 110. In some aspects, the location data is associated with one or more IP addresses corresponding to the one or more computing devices connected with the cloud service. In some aspects, the location data includes one or more of a latitude, a longitude, or an altitude. In some aspects, one or more of the network identifiers includes bit information associated with a number of IP addresses corresponding to an individual network. In some aspects, the location data comprises a time zone.

The location data for the telecommunication network and the location data for the server is mapped via one or more processors. In some embodiments, the latitude and the longitude for each telecommunication network in each subset of the plurality of telecommunications networks are mapped to a plurality of servers and server clusters. In some embodiments, the system mapping the location data is frequently refreshed so that updated location data is mapped. The system mapping the location data may comprise one or more applications and components that support the mapping function(s). The location data may be mapped using one or more of a table, a graph, a chart, 2D graphing techniques, multi-dimensional graphing techniques, a model, geocoding, other mapping techniques, or a combination thereof. In some aspects, the mapping is based on telecommunication network properties, such that the mapping distinguishes networks having lower capabilities than other networks, networks having higher traffic than other networks, networks having other distinguishable network properties, or a combination thereof.

Based on the mapping, a first MID server is determined to have a distance to at least one network that is below a first threshold or that is a shortest distance to the at least one network compared to the plurality of networks. In some aspects, each telecommunication network in one of a plurality of subsets of networks has a distance to the first server (e.g., a MID server or a MID server cluster) that is below the first threshold. In some aspects, the distance to each server is determined for each network in the plurality of networks. In some aspects, the distance is determined to be below the first threshold (or determined to be the shortest distance) by calculating a spherical distance between the longitude and the latitude for a network and a longitude and a latitude identified for the server. In some aspects, the spherical distance is calculated using the haversine formula.

The haversine formula is an equation usable in navigation, giving great-circle distances between two points on a sphere (one point from a network and the other point from the server) from their longitudes and latitudes. The haversine formula may be used to calculate the distance between two points on Earth's surface specified in longitude and latitude.

The haversine formula may be used to locate the distance between the location data for the network and the location data for the server by performing calculations, such as the following, for example:

$$\Delta \text{long} = (\text{long}2 + \text{long}1)\cos((\text{lat}1 + \text{lat}2)/2) = \cos a \cos b - \sin a \sin b$$

$$\Delta \text{lat} = (\text{lat}2 - \text{lat}1)$$

$$a = \sin 2(\Delta \text{lat}/2) + \cos(\text{lat}1)\cos(\text{lat}2)\sin 2(\Delta \text{long}/2)$$

$$d = \sqrt{(a)}R$$

Δlat=amount of change in latitude (km)
R=the radius of the earth is 6371 (km) (1 degree=0.0174532925 radians)
Δlong=magnitude of change in longitude (km)
d=distance (km) from the to points In some implementations, the imperial system is used. Above, a and b are related to the sides and an associated angle of a spherical triangle. The calculation of the distance from one point to another on the Earth's surface is affected by a certain degree of curvature associated with the spherical triangle.

Based on the one or more distances, an automated discovery schedule is assigned from a first server to an endpoint of a first telecommunication network. In some aspects, the discovery schedule comprises discovery schedule properties (for example, such as discovery schedule properties in FIGS. 2 and 4). The discovery schedule properties may include bit information associated with a number of IP addresses corresponding to the first telecommunication network associated with the automated discovery schedule assigned. In some aspects, a plurality of discovery schedules are assigned from the MID server to at least one endpoint associated with a subset of the plurality of telecommunication networks.

Figure 2:
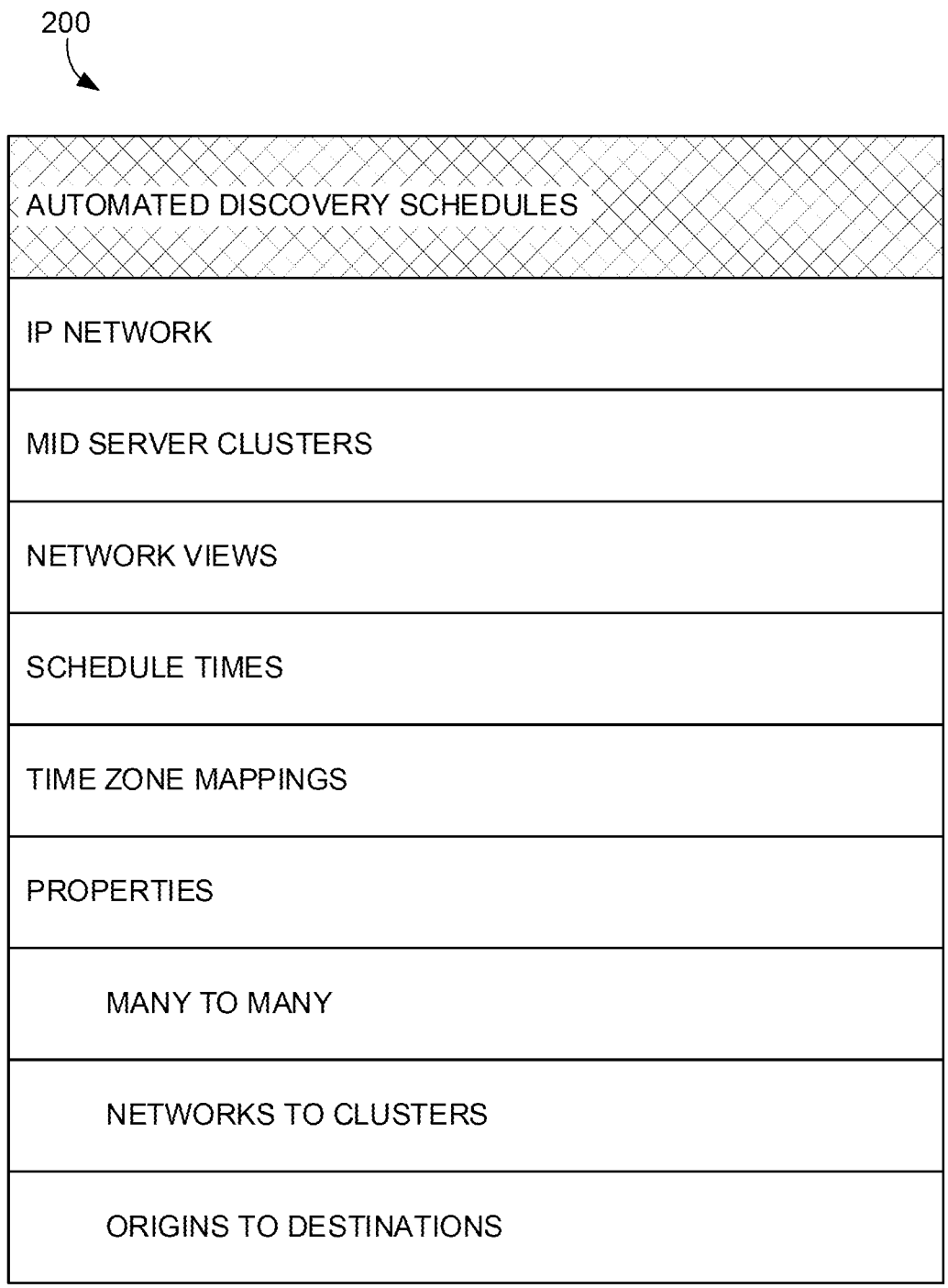
FIG. 2 depicts an example automated discovery schedule, in accordance with aspects herein.

FIG. 2 illustrates an example automated discovery schedule 200 comprising discovery schedule properties. For example, the discovery schedule properties may include identifying information for an IP network and one or more MID server clusters associated with the discovery schedule. Additionally, the discovery schedule properties may include time zone mappings associated with the network and server, network views, and schedule times for the discovery schedule. Further, other properties may include an indication that many networks are receiving the discovery schedule from many servers. Furthermore, other properties may include networks to clusters and origins to destinations.

FIG. 3 illustrates example interface 300 comprising telecommunication network properties. The network properties may include one or more of: a name identifier associated with bit information, a view identifier, a network IP identifier, a netmask identifier, a status identifier, a network type identifier, a network type identifier, a discovery schedule identifier, a description, comments, a size identifier, a site ID identifier, a location identifier, a location override, a company identifier, a VLAN identifier, a service identifier, a service blocker, other types of network properties, or a combination thereof.

FIG. 4 depicts example interface 400 comprising automated discovery properties for a discovery schedule. The automated discovery properties may comprise one or more of a number of minutes used as an interval between discovery schedule times, a maximum batch size, a maximum network block size, a time zone feature, other types of automated discovery properties, or a combination thereof.

FIG. 5 illustrates an example interface 500 comprising server cluster identifiers and network identifiers. For example, the server cluster identifiers are in a first column. The server cluster identifiers identify various MID server clusters associated with one or more networks. The network identifiers are in a second column and identify various networks associated with the MID server clusters. Example interface 500 may be used for assigning the automated discovery schedules.

Figure 6:
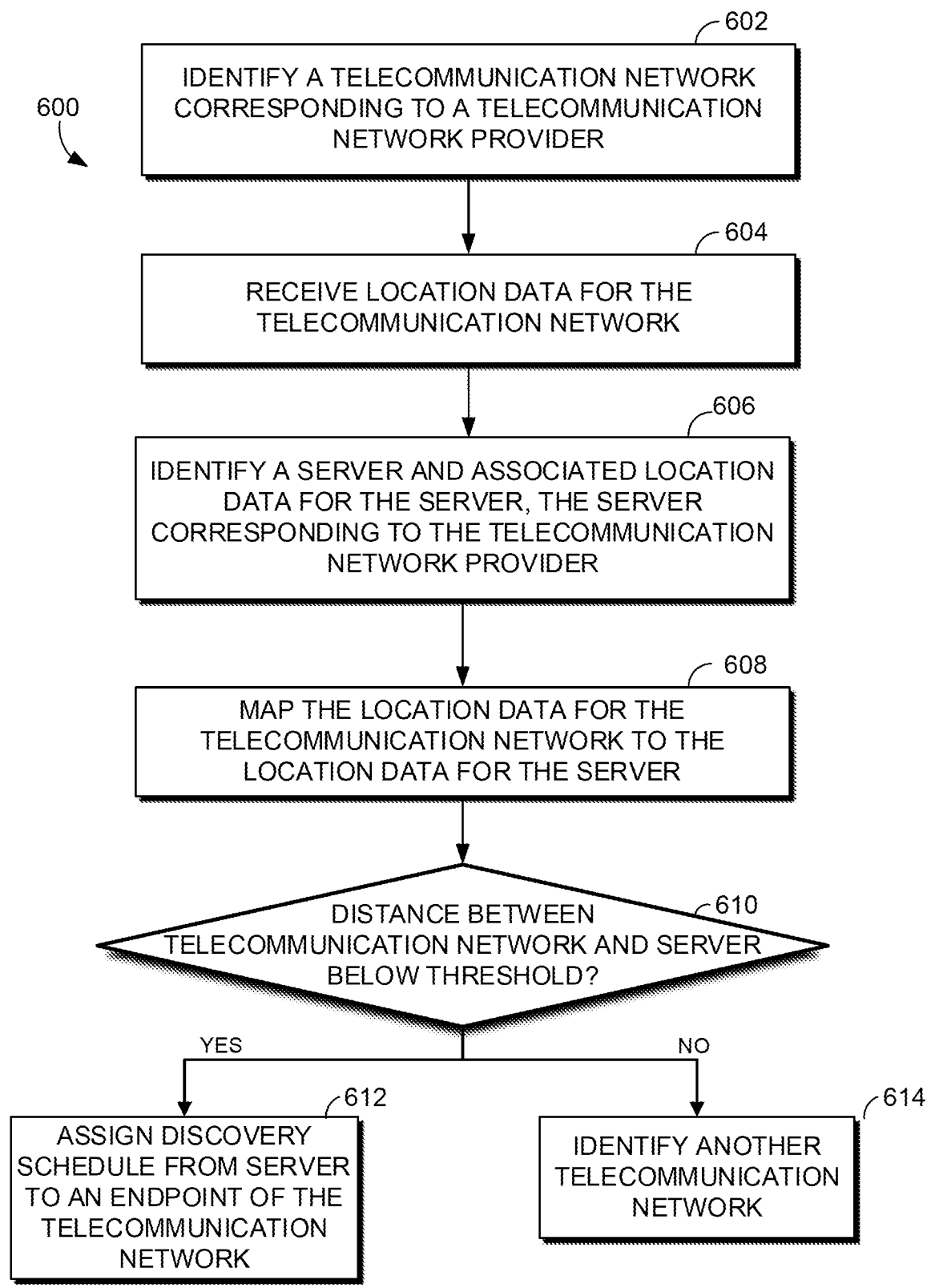
FIG. 6 depicts a flow diagram of an example method for automated discovery schedules for telecommunication service networks, in accordance with aspects herein.

Turning to FIG. 6, a flow diagram of example method 600 for assigning automated discovery schedules for telecommunication service networks is provided. At 602, a telecommunication network corresponding to a telecommunication network provider is identified. In some embodiments, the telecommunication network is identified based on one or more endpoints of the telecommunication network. In some aspects, the telecommunication network is identified based on one or more types of a network node associated with the telecommunication network. For example, the telecommunication network may be identified by a network address, such as an IP address. Continuing the example, a transport address associated with the IP address and a port number identifying a port associated with the IP address may be used to identify the telecommunication network.

The identified network may be associated with one or more file paths. The one or more file paths may be associated with one or more connected devices or components associated with an IP address. In some aspects, the telecommunication network identified comprises a plurality of types of connected networks other than a router-to-router communication. In some aspects, the telecommunication network identified corresponds to at least one router-to-router communication. In some aspects, one of the routers in the router-to-router communication does not have wireless capability (e.g., the routers are connected by a port and a cable). In some aspects, two or more routers in the router-to-router communication are wirelessly connected.

In some aspects, the telecommunication network is associated with location data. As such, at 604, the location data associated with the telecommunication network is received. The location data may comprise a latitude and a longitude (e.g., associated with an IP address corresponding to an endpoint). In some aspects, the location data further includes an altitude. In some aspects, the location data is determined from a location identifier associated with the telecommunication network. For example, wherein the telecommunication network may have telecommunication network properties stored at one or more databases, the telecommunication network properties comprising a virtual local-area-network identifier, a size identifier, and the location identifier. In some aspects, the location identifier is associated with one or more IP addresses. In some aspects, the location identifier corresponds to a physical address (e.g., associated with a street), which can be transformed into a latitude and longitude (and sometimes additionally an altitude).

In some aspects, the location identifier for the telecommunication network comprises a CLLI code. For example, the location data for the telecommunication network may be identified by parsing the CLLI code and determining a latitude and longitude from the CLLI code. The CLLI code may specify the location and function of one or more telecommunication components of the telecommunication network. In some aspects, the CLLI code identifies a relevant location, such as an international, state, city, or county border, for example. In some aspects, the CLLI code identifies a relevant location of one or more residential or commercial buildings or a particular floor of a building. In some aspects, the CLLI code identifies a particular room of a building, a particular warehouse, or another structure. In some aspects, other types of location data from the location identifier identify the particular room of the building or the other structure. Additionally, in some aspects, the other types of location data identify the relevant location (e.g., the international, state, city, or county border).

At 606, one or more servers and location data associated with the server are identified. The server corresponds to the telecommunication network provider. In some aspects, the server identified is a MID server. In some aspects, the server identified is a server cluster (e.g., such as a MID server cluster). In some aspects, the location data associated with the server comprises a latitude and a longitude (and an altitude in some embodiments). In some aspects, the location data associated with the server is an address associated with a particular building or other similar structure that is convertible into a latitude and a longitude. In some aspects, the location data of the server is associated with a particular floor or room of the particular building or other similar structure.

At 608, the location data associated with the telecommunication network is mapped to the location data of the server. In aspects, the location data is mapped based on a time in which the location data was determined or identified. For example, the mapping may be based on most recently identified location data for the telecommunication network and the location data for the server (e.g., updated location data for the telecommunication network). In some aspects, mapping the location data includes mapping geographical locations of the telecommunication network to a geographical location of the server. In some aspects, geographical locations of a plurality of telecommunication networks are mapped to geographical locations of a plurality of servers or datacenters comprising one or more servers. In some aspects, the mapping includes one or more of: GPS mapping, geographic information system mapping, real-time location systems mapping, 2D mapping, 3D mapping, triangulation mapping, other location mapping (e.g., using one or more tables or one or more graphs), or a combination thereof.

At 610, a distance between the telecommunication network and the server is determined based on the mapping. For example, the distance may be determined by calculating a spherical distance between the longitude and the latitude of the telecommunication network and the longitude and the latitude of the server. In some aspects, a plurality of distances are determined from the telecommunication network to the server based on a plurality of IP address associated with the telecommunication network. In some aspects, the spherical distance is determined by using a latitude, a longitude, and an altitude of the server and the latitude, the longitude, and the altitude of one or more associated IP addresses. In some aspects, the distance is determined by using the haversine formula to determine a great-circle distance between two points (one associated with the telecommunication network and one associated with the server) on a sphere by using the associated longitudes and latitudes.

If the distance between the telecommunication network and the server is determined to be below a threshold at 610, then the example method 600 assigns an automated discovery schedule from the server to an endpoint of the telecommunication network at 612. In some aspects, the automated discovery schedule comprises discovery schedule properties including bit information associated with a number of IP addresses corresponding to the telecommunication network. If the distance between the telecommunication network and the server is not below the threshold at 610, then the example method 600 identifies another telecommunication network at 614. Upon identification of the other telecommunication network, the method may repeat steps similar to steps 604-614.

Figure 7:
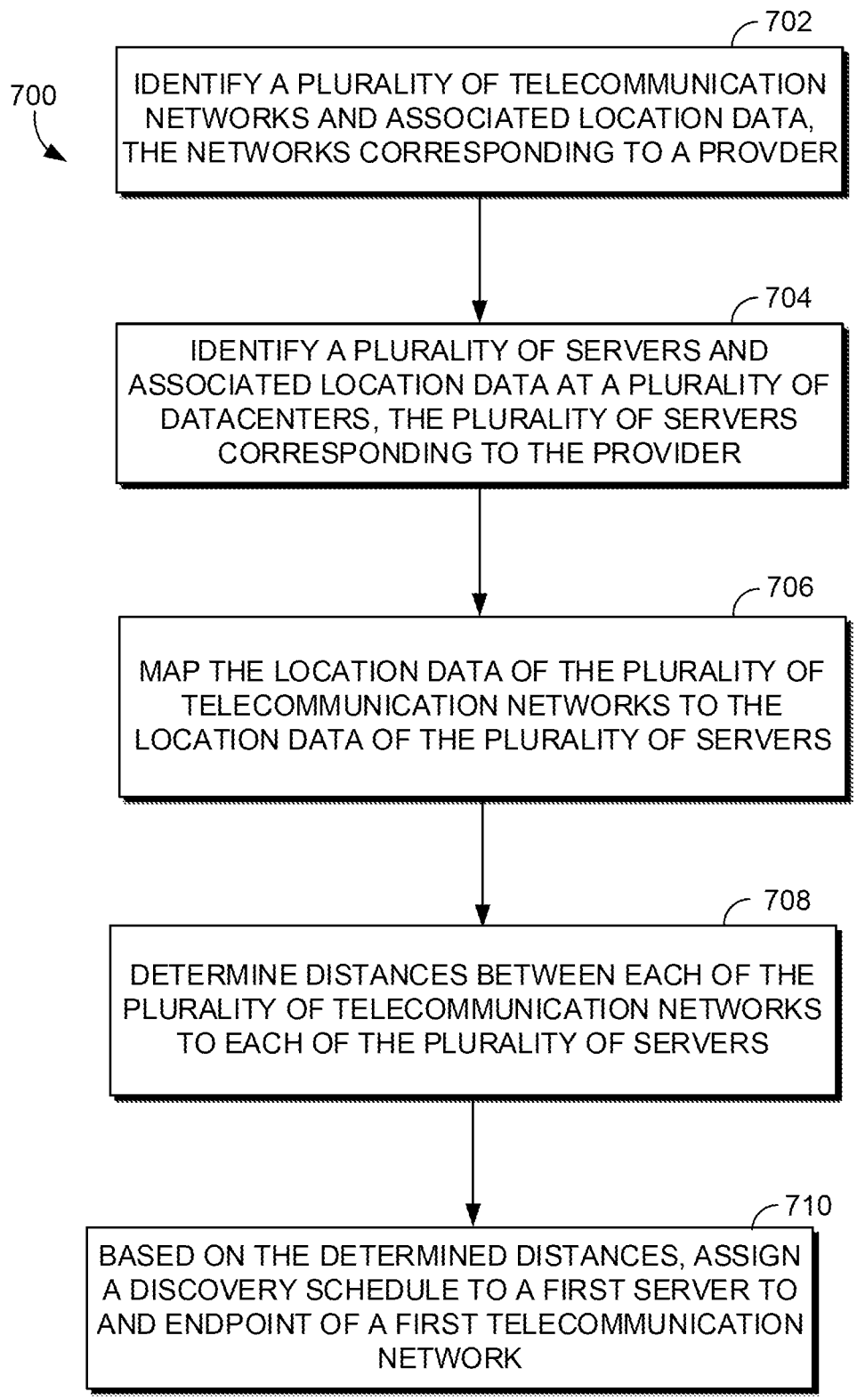
FIG. 7 depicts a flow diagram of another example method for automated discovery schedules for telecommunication service networks, in accordance with aspects herein.

FIG. 7 illustrates a flow diagram of example method 700 for assigning automated discovery schedules for telecommunication service networks is provided. At 702, a plurality of telecommunication networks corresponding to a telecommunication network provider are identified by using telecommunication network properties of each of the plurality of telecommunication networks. In aspects, the telecommunication network properties comprise a virtual local-area-network identifier, a size identifier, and a location identifier. The size identifier corresponding to each telecommunication network may be associated with bit information associated with each of a number of IP addresses. In some aspects, a subset of the plurality of telecommunication networks are identified based at least on the location identifier for each of the plurality of telecommunication networks.

In some aspects, the size identifier is associated with one or more network tasks distributed across one or more components associated with the telecommunications network. The network tasks may include, for example, business or operational services, IP ranges for each service, and network paths for each service. The components associated with the telecommunications network may include a load balancer and an application cluster configuration item, for example. Further, location data for each of the plurality of telecommunication networks is identified from the corresponding location identifier. The location data may include a latitude and a longitude. In some aspects, an altitude is also included. In some embodiments, the location identifiers comprise a common language location identifier code. In aspects, location data is updated and stored with an associated date-time stamp.

At 704, a plurality of servers and location data associated with each of the servers are identified. The plurality of servers correspond to the telecommunication network provider. In aspects, the plurality of servers comprise server clusters (e.g., MID server clusters). The location data corresponding to each of the plurality of MID servers may include a latitude and a longitude. In some aspects, an altitude is also included in the location data for each server. In some aspects, the location data for a MID server is stored in one or more databases that the corresponding MID server has singular access to. In some aspects, the location data for each MID server and each MID server cluster are stored via a cloud computing service accessible by a web browser application associated with the telecommunication network provider.

At 706, the location data from the plurality of telecommunication networks and the location data from the plurality of MID servers are mapped. Based on the mapping, a distance between each of the plurality of telecommunication networks (or each of the subset of the plurality of telecommunication networks) and each of the plurality of MID servers is determined at 708. In some aspects, a distance between each of the plurality of telecommunication networks (or each of the subset of the plurality of telecommunication networks) is also determined. In some aspects, based on the mapping, a first server (e.g., a first server cluster) of the plurality of servers (e.g., a plurality of MID server clusters) has a shortest distance to a first telecommunication network of the plurality of telecommunication networks (or a shortest distance to the first telecommunication network of the subset of the plurality of networks). For example, the shortest distance may be determined by calculating a spherical distance between the longitude and the latitude of the first telecommunication network and the longitude and the latitude of the first server cluster. In some aspects, the first server (e.g., a first MID server cluster) of the plurality of servers (e.g., a plurality of MID server clusters located at various datacenters) has a shortest distance to the subset of the plurality of telecommunication networks, the subset being one of a plurality of identified subsets of the plurality of telecommunication networks.

In some aspects, the distance between at least one of the plurality of telecommunication networks and one of the plurality of servers is below a first threshold. The distance between one of the plurality of telecommunication networks and one of the plurality of servers may be determined to be below the first threshold by calculating a spherical distance between the longitude and the latitude of the one telecommunication network and a longitude and a latitude identified for the one MID server. In some aspects, the distance is determined to be below the first threshold by using the haversine formula to determine a great-circle distance between two points (one associated with the location identifier of the one telecommunication network and one associated with the location data of the one server) on a sphere by using the associated longitudes and latitudes.

In some aspects, the subset of the plurality of telecommunication networks is identified or determined by determining that a distance from the latitude and the longitude of each telecommunication network of the subset to at least one telecommunication network of the subset is below the second threshold. The distance from the latitude and the longitude of each telecommunication network of the subset to at least one telecommunication network of the subset is determined to be below the second threshold by calculating a spherical distance between each telecommunication network of the subset using the longitude and the latitude for each corresponding telecommunication network. For example, the haversine formula may be used to determine the distances between each telecommunication network.

At 710, an automated discovery schedule is assigned from at least one MID server to an endpoint of at least one telecommunication network based on the distance between the MID server and the telecommunication network. In some embodiments, the automated discovery schedule is assigned based on the distance being below the first threshold. In some aspects, the automated discovery schedule is assigned based on the distance being the shortest distance among the distances between the plurality of telecommunication networks and the plurality of servers. In some aspects, the automated discovery schedule is assigned based on the distance being the shortest distance among the distances between each of the subsets of the plurality of telecommunication networks (e.g., using one set of location data for each of the subsets) and the plurality of servers. In some aspects, a plurality of automated discovery schedules are assigned from the MID server to at least one endpoint associated with the subset of the plurality of telecommunication networks. In some embodiments, the endpoint associated with a telecommunication network or the subset of the plurality of telecommunication networks may include one or more HTTP endpoints, one or more outbound cluster endpoints, one or more transmission control protocol endpoints, one or more enterprise archive inclusion endpoints, one or more other types of endpoints, or a combination thereof.

Figure 8:
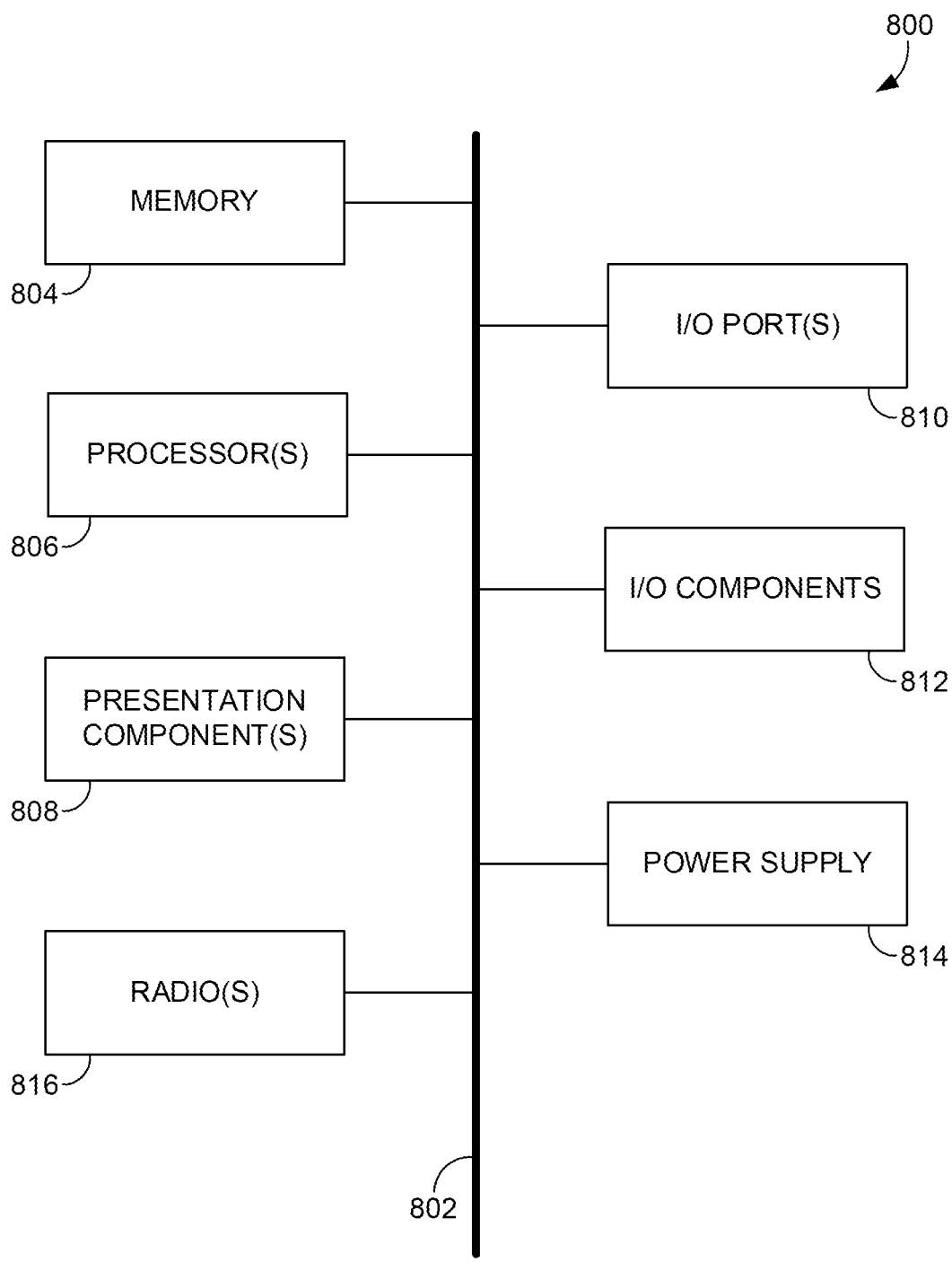
FIG. 8 depicts an exemplary computing environment suitable for use in implementations of the present disclosure, in accordance with aspects herein.

Turning now to FIG. 8, a diagram is depicted of an exemplary computing environment suitable for use in implementations of the present disclosure. In particular, the exemplary computer environment is shown and designated generally as UE/user device 800. User device 800 is but one example of a suitable computing environment and is not intended to suggest any limitation as to the scope of use or functionality of the invention. Neither should user device 800 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 8, user device 800 includes bus 802 that directly or indirectly couples the following devices: memory 804, one or more processors 806, one or more presentation components 808, input/output (I/O) port(s) 810, I/O component(s) 812, power supply 814, and radio(s) 816. Bus 802 represents what may be one or more busses (such as an address bus, data bus, or combination thereof). Although the devices of FIG. 8 are shown with lines for the sake of clarity, in reality, delineating various components is not so clear, and metaphorically, the lines would more accurately be grey and fuzzy. For example, one may consider a presentation component such as a display device to be one of I/O component(s) 812. Also, processors, such as one or more processors 806, have memory. The present disclosure hereof recognizes that such is the nature of the art, and reiterates that FIG. 8 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 8 and refer to "user device."

User device 800 typically includes a variety of computer-readable media. Computer-readable media can be any available media that can be accessed by user device 800. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Further, computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information discovery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Turning to memory 804, memory 804 includes computer-storage media in the form of volatile or nonvolatile memory. Memory 804 may be removable, nonremovable, or a combination thereof. Examples of memory 804 include solid-state memory, hard drives, optical-disc drives, etc. For instance, memory 804 may include RAM, ROM, Dynamic RAM, a Synchronous Dynamic RAM, a flash memory, a cache memory, a buffer, a short-term memory unit, a long-term memory unit, or other suitable memory units. Removable memory may include, for example, a hard disk drive, a floppy disk drive, a Compact Disk drive, a CD-ROM drive, a DVD drive, or other suitable removable units.

Turning to the one or more processors 806, the one or more processors 806 read data from various entities such as bus 802, memory 804 or I/O component(s) 812. The one or more processors 806 include, for example, a Central Processing Unit, a Digital Signal Processor, one or more processor cores, a single-core processor, a dual-core processor, a multiple-core processor, a microprocessor, a host processor, a controller, a plurality of processors or controllers, a chip, a microchip, one or more circuits, circuitry, a logic unit, an IC, an ASIC, or any other suitable multi-purpose or specific processor or controller. Further, the one or more processors 806 execute instructions, for example, of an Operating System of the user device 800 or of one or more suitable applications.

Further, the one or more presentation components 808 present data indications to a person or other device. Examples of one or more presentation components 808 include a display device, speaker, printing component, vibrating component, etc. Additionally, I/O port(s) 810 allow user device 800 to be logically coupled to other devices including I/O component(s) 812, some of which may be built in user device 800. Illustrative I/O component(s) 812 include a microphone, joystick, game pad, satellite dish, scanner, printer, wireless device, etc. Furthermore, power supply 814 may include any suitable source of power, such as a rechargeable lithium polymer battery or an alternating current power converter.

Turning to radio 816, the radio 816 facilitates communication with a wireless telecommunication network. For example, radio 816 may facilitate communication via wireless communication signals, RF signals, frames, blocks, transmission streams, packets, messages, data items, or data. The terms "radio," "controller," "antenna," and "antenna array" are used interchangeably to refer to one or more software and hardware components that facilitate sending and receiving wireless radio-frequency signals, for example, based on instructions from a cell site. Radio 816 may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1 ½ wavelength. The antennas may be monopole, loop, parabolic, traveling-wave, aperture, yagi-uda, conical spiral, helical, conical, radomes, horn, or apertures, or any combination thereof. The antennas may be capable of sending and receiving transmission via mmWaves, FD-MIMO, massive MIMO, 3G, 4G, 5G, or 802.11 protocols and techniques, etc.

Illustrative wireless telecommunications technologies that radio 816 may facilitate include CDMA, GPRS, TDMA, GSM, and the like. Radio 816 might additionally or alternatively facilitate other types of wireless communications including Wi-Fi, WiMAX, LTE, or other VoIP communications. As can be appreciated, in various embodiments, radio 816 can be configured to support multiple technologies or multiple radios can be utilized to support multiple technologies.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A method for assigning automated discovery schedules for telecommunication networks, the method comprising:
    identifying a telecommunication network corresponding to a telecommunication network provider;
    receiving location data for the telecommunication network;
    identifying a management instrumentation and discovery (MID) server and location data associated with the MID server, the MID server corresponding to the telecommunication network provider;
    mapping the location data for the telecommunication network and the location data for the MID server;
    determining, based on the mapping, that the MID server has a distance to the telecommunication network that is below a first threshold; and
    assigning a discovery schedule from the MID server to an endpoint of the telecommunication network.

2. The method according to claim 1, wherein the telecommunication network is associated with at least one router-to-router communication.

3. The method according to claim 1, wherein the discovery schedule comprises discovery schedule properties including bit information associated with a number of IP addresses corresponding to the telecommunication network.

4. The method according to claim 1, further comprising:
    identifying a plurality of telecommunication networks corresponding to the telecommunication network provider by using telecommunication network properties of each of the plurality of telecommunication networks, the telecommunication network properties comprising a virtual local-area-network identifier, a size identifier, and a location identifier;
    identifying a subset of the plurality of telecommunication networks based at least on the location identifier for each of the plurality of telecommunication networks, the subset comprising the telecommunication network;
    receiving a latitude and a longitude for each telecommunication network in the subset;
    mapping the latitude and the longitude for each telecommunication network in the subset;
    determining, based on mapping the location data for the MID server and mapping the latitude and the longitude for each telecommunication network in the subset, that the MID server has a distance to each telecommunication network in the subset that is below the first threshold; and
    assigning a plurality of discovery schedules from the MID server to at least one endpoint associated with the subset.

5. The method according to claim 4, wherein the subset of the plurality of telecommunication networks is identified by determining that a distance from the latitude and the longitude of each telecommunication network of the subset to at least one telecommunication network of the subset is below a second threshold.

6. The method according to claim 5, wherein:
    the distance from the MID server to the telecommunication network is determined to be below the first threshold by calculating a spherical distance between the longitude and the latitude of the telecommunication network and a longitude and a latitude identified for the MID server; and
    the distance from the latitude and the longitude of each telecommunication network of the subset to at least one telecommunication network of the subset is determined to be below the second threshold by calculating a spherical distance between each telecommunication network of the subset using the longitude and the latitude for each corresponding telecommunication network.

7. Non-transitory computer-readable media having computer-usable instructions embodied thereon that, when executed by a processor, perform operations for assigning automated discovery schedules for telecommunication networks, the operations comprising:
    identifying telecommunication network properties for each of a plurality of telecommunication networks corresponding to a telecommunication network provider, the telecommunication network properties for each of the plurality of telecommunication networks including at least a location identifier;
    identifying a plurality of management instrumentation and discovery (MID) servers and location data associated with each of the plurality of MID servers, the plurality of MID servers corresponding to the telecommunication network provider;
    mapping data from the location identifier for each of the plurality of telecommunication networks and the location data associated with each of the plurality of MID servers;
    determining, based on the mapping, a first MID server of the plurality of MID servers has a distance to a first telecommunication network of the plurality of telecommunication networks that is below a first threshold; and causing an assignment of a discovery schedule from the first MID server to an endpoint of the first telecommunication network.

8. The non-transitory computer-readable media of claim 7, wherein the location identifier is associated with one or more IP addresses, and wherein the data from the location identifier for each of the plurality of telecommunication networks includes a latitude and a longitude.

9. The non-transitory computer-readable media of claim 7, wherein the operations further comprise:
   calculating, based on the mapping, a spherical distance between each of the plurality of telecommunication networks and each of the plurality of MID servers; and
   determining the spherical distance between the first telecommunication network and the first MID server is a shortest spherical distance of a plurality of spherical distances calculated.

10. The non-transitory computer-readable media of claim 9, wherein the spherical distance between each of the plurality of telecommunication networks and each of the plurality of MID servers is calculated using a longitude and a latitude corresponding to the data from the location identifier for each of the plurality of telecommunication networks and a longitude and a latitude corresponding to the location data associated with each of the plurality of MID servers.

11. The non-transitory computer-readable media of claim 7, wherein the first MID server is a cluster of MID servers.

12. The non-transitory computer-readable media of claim 7, wherein the location identifier for each of the plurality of telecommunication networks comprises a common language location identifier code.

* * * * *